Patented Nov. 29, 1932

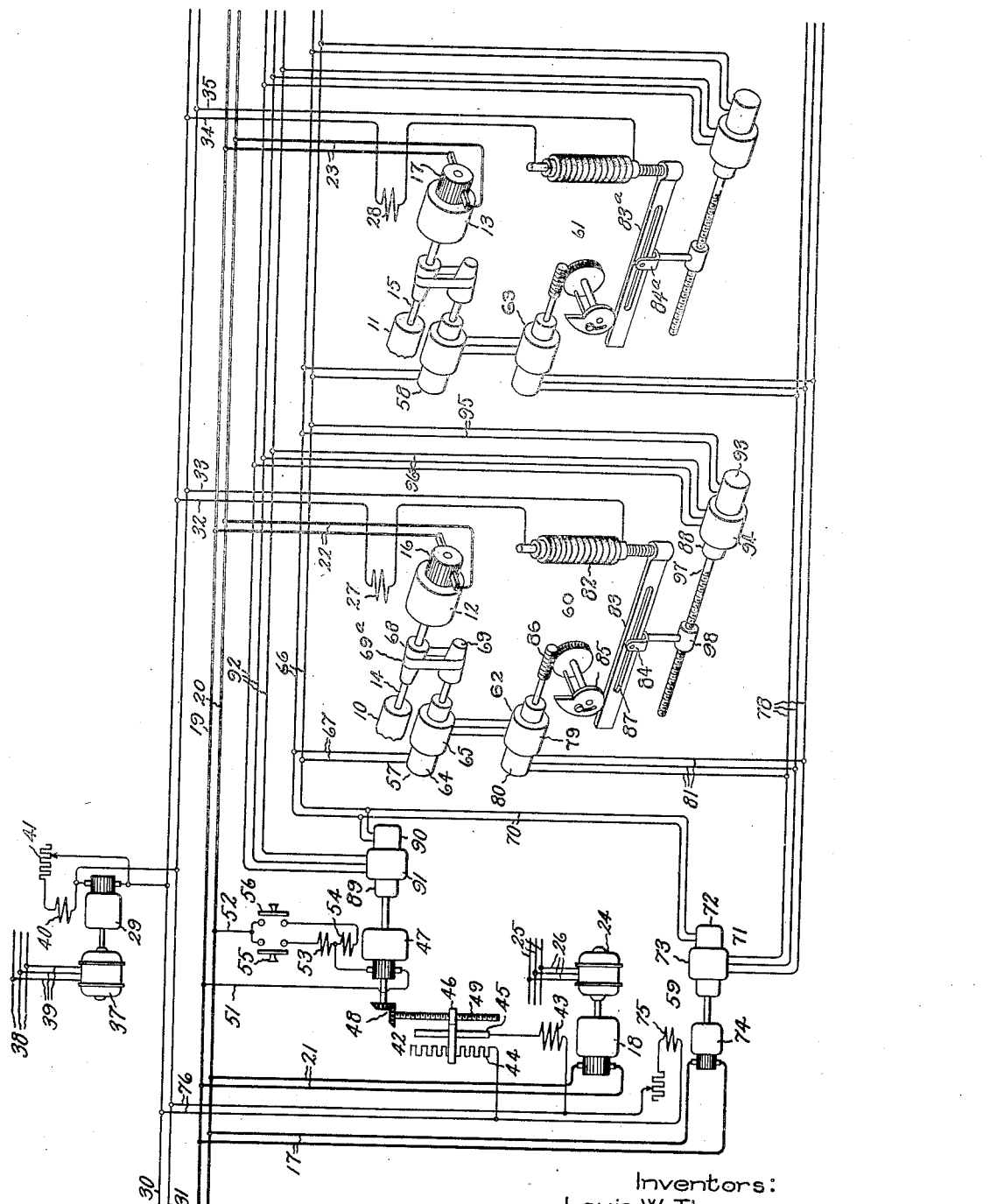

1,889,616

UNITED STATES PATENT OFFICE

LOUIS W. THOMPSON, OF SCHENECTADY, NEW YORK, AND EDWARD H. HORSTKOTTE, OF ERIE, PENNSYLVANIA, ASSIGNORS TO GENERAL ELECTRIC COMPANY, A CORPORATION OF NEW YORK

CONTROL SYSTEM

Application field December 16, 1930. Serial No. 502,738.

This invention relates to control systems, more particularly to systems for controlling the operation of electric motors, and has for an object the provision of a simple, reliable and efficient system of the kind.

More specifically the invention relates to control systems for plural motor drives for paper making machines, printing presses and the like, wherein a plurality of elements are required to operate in a predetermined relationship with respect to each other and a further object of the invention is to provide a speed regulating system for maintaining a constant speed ratio between the elements that shall effect a change or adjustment in the basic speed of the drive without disturbing the speed ratio between the elements.

It is known that the speed of operation of a regulator for maintaining a characteristic of a dynamo electric machine constant at a desired value varies in accordance with the magnitude of the value of the characteristics that is being held. Thus, in the case of a speed regulator for a motor the operation of the regulator when maintaining a slow speed, for example 200 R. P. M. is very slow, whilst when maintaining a higher speed, for example 1,000 R. P. M. the action of the regulator is exceedingly fast. It will thus be seen that in a plural motor drive for a paper making machine and the like the action of a speed regulator for one of the sectional motors at low basic speeds of the drive may be so sluggish as to cause a breakage in the paper before the speed can be restored to the correct value, and likewise at high basic speeds, the action of the regulator may be so fast and erratic as to cause hunting of the motor and consequently a breakage of the paper. Accordingly a further object of the invention is the provision of a regulating system by means of which a uniformly good control can be obtained throughout the entire speed range of the drive.

In carrying the invention into effect in one form thereof we provide regulators having a pressure responsive resistance connected in circuit with a dynamo electric machine for controlling an operating characteristic thereof, together with means for controlling the operation of the regulator itself in accordance with adjustments in the value of the characteristic. More specifically we employ a regulator comprising a pressure responsive resistance in circuit with an adjustable speed motor, and a lever having an adjustable fulcrum for actuating the resistance together with means for varying the position of the fulcrum of the lever so as to vary the operating speed of the regulator in accordance with adjustments in the basic speed of the motor, thus providing uniformly good speed control over the entire speed range of the motor.

In illustrating the invention in one form thereof we have shown it as embodied in a sectional motor drive employed to operate a sectionalized paper making machine, printing press or the like in which a plurality of elements are required to run in fixed speed relationship with respect to each other. For a better and more complete understanding of the invention reference should now be had to the following specification and to the accompanying drawing the single figure of which is a diagrammatical representation of an embodiment of the invention.

Referring now to the drawing the rolls 10, 11 of a sectionalized machine such for example as a paper making machine are driven by means of suitable electric motors 12, 13 respectively to the drive shafts 14, 15 of which the rolls are connected by means of any suitable driving connections. In the drawing, the rolls 10, 11 are shown mounted directly on the drive shafts to the motors.

The motors 12, 13 are shown as separately excited direct current motors, the respective armature members 16, 17 of which are supplied with direct current from any suitable source of direct current supply such for example as a direct current generator 18 which is connected to the supply buses 19, 20 by means of conductors 21; the armature of motor 16 being connected to the supply buses 19, 20 by conductors 22 and the armature 17 of motor 13 being connected to the same supply buses 19, 20 by the conductors 23 as shown in the drawing.

The supply generator 18 is driven by any suitable driving means such for example as the alternating current electric motor 24 which in turn is supplied with alternating current from any suitable source such as the poly-phase source represented in the drawing by the three supply lines 25 to which the terminals of the motor 24 are connected by conductors 26 as shown. As previously stated the motors 12, 13 are shown as separately excited motors; they being respectively provided with separately excited field windings 27, 28 which are supplied from any suitable direct current source, represented in the drawing by the exciter 29, the armature of which supplies the constant excitation busses 30, 31 to which the field winding 27 is connected by conductors 32, 33 and to which the field winding 28 is connected by means of conductors 34, 35.

The exciter 29 is driven at a speed which is preferably substantially constant by any suitable driving means such for example as that represented in the drawing by the alternating current motor 37 which is supplied with alternating current from any suitable supply source such for example as that represented in the drawing by the three conductors 38 to which the terminals of the motor 37 are connected by means of the three conductors 39. The exciter 29 is self excited; it being provided with a field winding 30, the opposite terminals of which are connected to the armature terminals of the exciter in series with an adjustable resistance 41 by means of which the generated voltage of the exciter may be adjusted as desired to provide the correct excitation for the field windings 27, 28 of the drive motors 12, 13.

The speed of the drive motors 12, 13 may be varied over a wide range of basic values by varying the terminal voltage of the supply generator 18, and for this purpose a motor controlled rheostat 42 is provided for varying the excitation of the separately excited field winding 43 of the supply generator 18; the field winding 43 being in turn supplied from the constant voltage excitation busses 30, 31 from which the field windings 27 and 28 of the drive motors are supplied.

As shown in the drawing the motor controlled rheostat 42 comprises a variable resistance 44, a stationary contact 45 and a movable contact 46 which bridges the resistance and the stationary contact 45. The movable contact 46 is operated either in an upwardly or a downwardly direction to vary the amount of the resistance 44 in circuit with the field winding 43 by any suitable driving means such for example as the small electric pilot motor 47 to the drive shaft of which the movable contact 46 is connected by means of the bevel gearing 48 and a screw member 49; the contact 46 being provided with threads which engage the threads of the screw member 49. The pilot motor 47 is supplied with electric energy from any suitable source of power such for example as the busses 19, 20 which are supplied from the generator 18 and to which the terminals of the pilot motor 47 are connected by means of the conductors 51 and 52. It will be observed that the pilot motor 47 is provided with two differentially wound field windings 53 and 54 to provide for rotation of the motor in opposite directions; a push button 55 serving to connect the armature of the motor to the busses 19, 20, with the differential field winding 53 in circuit to provide for rotation of the motor in one direction, for example the forward direction, and the push button 56 serves to connect the armature of the motor to the supply busses with the field windings 54 in circuit to provide for rotation of the motors in the opposite or reverse direction. It will thus be observed that the speed of the drive motors 12, 13 may be increased or decreased as desired simply by depressing either of the switch buttons 55, 56 to decrease or increase the amount of the resistance 44 and thereby increase or decrease the terminal voltage of the supply generator 18.

The supply generator 18 and the motors 12, 13 supplied therefrom comprise a Ward-Leonard system and it will be understood by persons skilled in the art that a system of this type has a very wide speed range; the ratio between top and bottom speeds being approximately 10-1. In order that the separate elements 10, 11 located at the various sections of the paper making machine may be made to operate in predetermined relationship with each other at any speed within such a wide range between the top and bottom values it is necessary that a very flexible speed regulating arrangement be provided; the speed regulating system shown in the drawing comprising separate inductive devices 57, 58 operatively associated with the drive motors 12 and 13 respectively, a master frequency set 59, and separate speed regulating units 60 and 61, one unit for each section of the drive, and separate electrical differential devices 62, 63 for actuating the regulating units in response to the existence of a differential relationship between the master inductive device 59 and the separate inductive devices 57, 58 located at the various sections of the drive.

Since the separate inductive devices 57, 58 located at various sections of the drive are in all respects identical with each other only the inductive device 57 will be described in detail. This device comprises a rotor member 64 and a stator member 65 each provided with windings in inductive relationship with each other. The winding (not shown) on the rotor member 64 is preferably a single phase winding and is supplied from any suitable single phase source such for example as that represented in the drawing by the supply conductors 66 to which the terminals of this winding are connected by the conductors 67. A rotor member 64 is driven at a speed which is proportional to the speed of the drive motor 12 to the drive shaft of which it is connected by any suitable connecting means such for example as the variable speed arrangement shown in the drawing as comprising the cone pulley 68 mounted on the drive shaft of the motor 12, the cone pulley 69 mounted on the shaft of rotor member 64 and the connecting belt 69a which may be shifted to any desired position on the pulleys by a suitable belt shifting means (not shown). The inductive device 58 comprises similar elements similarly connected with the drive motor 13.

The master set 59 comprises an inductive device 71 having a rotor member 72 provided with a single phase winding (not shown) supplied from the single phase source 66 to which the terminals of this single phase winding are connected by means of the conductors 70, and a stator member 73 provided with a distributed poly-circuit winding (not shown) in inductive relation with the single phase winding on the rotor member. The rotor member is driven by a suitable driving means shown in the drawing as a separately excited direct current motor 74 having a field winding 75 supplied from the constant excitation busses 30, 31 to which it is connected by the conductors 76, and having its armature member supplied with direct current from the supply busses 19, 20 to which it is connected by means of the conductors 17 as shown.

The terminals of the poly-circuit windings on the stator member 73 are connected to supply the regulating busses 78 and consequently these busses are energized with a poly-phase alternating voltage having a frequency proportional to the speed at which the rotor member 72 is driven. It will thus be clear that since the pilot motor 74 which drives the rotor 72 is supplied from the variable voltage busses 19, 20 from which the sectional drive motors 12, 13 are supplied that the frequency of this alternating polyphase voltage at the busses 78 will be proportional to the speed at which the motors 12, 13 operate. It will also be understood that when the motor controlled rheostat 42 for the supply generator 18 is operated to increase or decrease the terminal voltage of the supply generator so as to increase or decrease the speed of the motors 12, 13, that the speed of the pilot motor 74 will likewise be increased or decreased in proportion and as a result the frequency of the voltage at the busses 78 will also be increased or decreased in proportion.

The differential electrical device 62 comprises a stator member 79 having a poly-circuit winding (not shown) which is connected to the terminals of the poly-circuit winding on the stator member 65 of inductive device 57, and a rotor member 80 likewise provided with a poly-circuit winding (not shown) which is connected to the regulating busses 78 by means of the conductors 81. Persons skilled in the art will understand that since the rotor members 64 of the inductive device 57 is driven by the motor 12 at a speed proportional thereto that there will be induced in the winding on the stator member 65 a poly-phase voltage having a frequency proportional to the speed of the motor 12. Since the terminals of the windings on the stator member 65 are connected to the terminals of the windings on the stator member 79 of the differential device, this latter winding will set up a rotating magnetic field which rotates in space at a speed proportional to the frequency of the current supplied thereto and consequently to the speed of the motor 12. It will also be clear that since the poly-circuit winding on the rotor member 80 of the differential device is supplied from the regulating busses 78 that this latter winding will also set up a rotating magnetic field which will rotate in space at a speed proportional to the speed at which the motors 12, 13 operate. By shifting the belt 69a in one direction or the other upon the cone pulleys 68, 69 the frequency of the poly-phase voltage supplied to the winding on the stator member 79 can be made to exactly equal the frequency of the poly-phase voltage supplied to the winding on the rotor member 80 when motor 12 is rotating at a desired speed. When this condition obtains the rotating magnetic field produced by the windings on the stator member will rotate in space at exactly the same speed as the rotating field which is produced by the winding on the rotor member and consequently there will be no tendency whatsoever for the rotor member 80 to rotate relatively to the stator and the latter will remain at rest. However, should the phase relationship between the alternating voltages supplied to the windings on the rotor and stator members of the differential device tend to change the phase relationship between the axes of the rotating magnetic fields produced by these windings will likewise tend to change but this will cause the current supplied to these windings to increase to such an extent that a torque will be developed between the rotor and stator members and rotation of the rotor member will ensue in such a direction as to maintain the synchronous relationship between the axes of these rotating magnetic fields. It will thus be seen that departure of the speed of the motor 12 from its desired speed will effect rotation of the rotor member 80 of the electrical differential device.

Since the regulating devices 60, 61 are in all respects identical only the device 60 will be described in detail. This device comprises a pressure responsive resistance (shown in the drawing as a carbon pile resistance 82) connected in series with the separately excited field winding 27 of the motor 12, a lever 83 movable about an adjustable fulcrum 84, and a cam member 85 which is rotated by the rotor member 80 of the differential device to the drive shaft of which it is connected by any suitable connecting means such for example as the worm gearing 86 as shown in the drawing. It will be observed that the lever 83 is provided with a longitudinal slot 87 in which the adjustable fulcrum member 84 can be moved back and forth to vary the lever ratio between the cam 85 and the carbon pile resistance 82 and thus to require a greater or a lesser rotation of the cam 85 to effect a predetermined change in the resistance of the carbon pile. As previously pointed out in the specification the action of the speed regulator of the type so far described will be sluggish when maintaining a slow speed of the motor such for example as 200 R. P. M. and will be unduly fast and erratic when holding a high speed of the motor such for example as 1500 R. P. M. In order to overcome this disadvantage, we provide means for varying the position of the fulcrum 84 in the slot 87 in accordance with adjustments in the speed of the drive and thereby to modify the regulating action i. e. the speed of operation of the regulator. The means shown comprises an electrical angular motion receiving device 88 and an electrical angular motion transmitting device 89 driven by the pilot motor 47. The motion transmitting device 89 comprises a rotor member 90 mounted on the drive shaft of the pilot motor 47 and provided with a single phase winding (not shown) supplied from any suitable single phase source such for example as that represented by the conductors 66 to which it is connected as shown, and a stator member 91 provided with a distributed poly-circuit winding (not shown) the terminals of which are connected to the busses represented in the drawing by the conductors 92. The motion receiving device 88 is provided with a rotor member 93, a stator member 94; the rotor member being provided with a single phase winding which is supplied from the same single phase source as that from which the windings on the rotor member 90 of the transmitting device is supplied and the stator member 94 is provided with a distributed poly-circuit winding, the terminals of which are connected to the busses 92 by means of the conductors 96. As shown in the drawing the rotor member is mounted upon a shaft 97 which has an elongated threaded portion extending beneath the lever arm 83 and as shown it engages a nut 98 in which is mounted a movable fulcrum member 84. Persons skilled in the art will understand that the single phase winding upon the rotor member 90 of the motion transmitting device induces alternating voltages in the winding on the rotor member 91 which are supplied to the busses 92 and likewise that the winding on the rotor member 93 of the motion receiving device induces voltages in the winding on the stator member 94 which are likewise supplied to the busses 92. As long as the axes of the rotor windings on both the transmitting and receiving devices occupy similar positions relative to the poly-circuit stator windings the voltages induced in these stator windings will be equal and opposite and consequently a minimum of current will flow in the stator windings. However, as soon as the axis of the winding of the rotor member 90 of the transmitting device is moved relatively to the axis of the winding on the stator member this balanced relationship of the voltages will be disturbed and consequently currents will be set up in the winding on the stator member 94 of the motion receiving device and consequently a torque will be caused to exist between the rotor and stator members of the motion receiving device and the rotor member will rotate through the same number of electrical degrees as the winding on the motion transmitting device. When the rotor member 93 of the receiving device has been rotated through the same number of electrical degrees as the rotor member 90 of the transmitting device, the balanced relationship between the voltage induced in the stator windings of these devices will again obtain and no further motion of the rotor of the receiving device will take place. It will be clear that rotation of the rotor member 93 of the transmitting devices causes the nut 98 to be actuated in one direction or another along the threaded shaft 97 and thus to shift the fulcrum 84 of the lever 83.

The elements and connections of the regulating device 61 and also the regulating devices of all succeeding sections of the drive are exactly identical with those of the regulating device 60 which has just been described in detail.

With the above understanding of the elements, and the manner in which they are connected or associated with each other the operation of our system will readily be understood from the detailed description which follows:

It will be assumed that the electric motor 24 which drives the generator 18 and the electric motor 37 which drives the exciter 29 have both been started up by suitable starting devices (not shown) and that the generator 18 is supplying voltage to the supply busses 19, 20 while the exciter 29 is likewise supplying voltage to the busses 30, 31. The position of the movable contact 46 on the resistance 44 indicates that the excitation of the generator 18 is about half way between the maximum and minimum values and that consequently the generated voltage and likewise the speeds of the drive motors 12, 13 at the various sections of the drive are operating at a speed approximately half way between the minimum and maximum speed values. As previously pointed out the pilot motor 74 drives the rotor member 72 of the inductive device 71 at a speed proportional to that at which the sectional drive motors 12, 13 are operating and consequently it will supply an alternating poly-phase voltage to the busses 78 which in turn is supplied to the poly-phase windings on the rotor member 80 of the electrical differential device 62. Likewise the rotor member 64 of the inductive device 57 which is driven by the drive motor 12 supplies an alternating poly-phase voltage to the poly-phase windings on the stator member 79 of the differential device. The voltages supplied to the windings on the rotor and stator members of the differential device cause rotating magnetic fields to be set up by each of these windings and as long as the axes of the windings on the rotor members 64 and the rotor member 72 remain in their predetermined relationship with each other the current flowing in the windings on the above rotor and stator members of the differential device will be minimum and the rotating magnetc fields set up by these windings will remain in a fixed relationship with respect to each other. This relationship will obtain as long as the drive motor 12 operates at the desired speed.

Should the speed of the motor 12 decrease, for any reason whatsoever, such for example as a sudden increase in load on the element 10 the axis of the winding on the rotor member 64 will tend to lag the axis of the winding on the rotor member 72 and consequently the axis of the rotating magnetic field set up by the windings on the stator member 79 of the differential device will tend to lag the axis of the rotating magnetic field set up by the windings on the rotor member of the differential device. As a result of this the current in the windings on both the rotor and stator members of the differential device will increase and will cause a sufficient torque to exist between the rotor and stator members which will cause the rotor member 80 of the differential device to rotate in such a direction as to operate the cam member 85 in a clockwise direction thus permitting the lever 83 to rotate in a clockwise direction and thus to lessen the pressure on the resistance of the carbon pile 82. This lessening of the pressure on the carbon pile 82 results in an increase in its ohmic resistance and consequently in a decrease in the current flowing in field winding 27 of the motor 12 which causes the motor to increase its speed. This action continues until the speed of motor 12 has increased to its former value at which time the axes of the windings on the rotor members 64 and 72 will again be in step with each other and likewise the axes of the rotating magnetic fields set up by the windings on the stator member 79 and rotor member 80 of the differential device will be in step with each other and consequently there will be no torque existing between the stator and rotor of the differential device and the motion of the rotor will cease.

Persons skilled in the art will understand that had the speed of the motor 12 increased for any reason such for example as a sudden decrease in the load on the element 10 the action of the regulating device would have been exactly the opposite of that described above. Likewise it will be clear that had the speed of the motor 13 or any of the other drive motors at the succeeding sections of the drive increased or decreased the action of the regulating device located at that particular section of the drive would have been exactly the same as that just described for the motor 12.

Now let it be assumed that it is desired to increase the basic speed of the drive, i. e., simultaneously increase the speed of all the drive motors 12, 13 etc. Depression of the start button 55 which controls the operation of the rheostat motor 47 causes the armature and differential field windings 53 to be energized across the supply busses 19, 20, thereby causing the motor 47 to operate the movable contact member 46 in a downwardly direction so as to increase the excitation of the generator 18 and likewise to increase its generative voltage. This increase in the generated voltage of the generator 18 will increase the speed of the motors 12—13 which are supplied therefrom, as will be well understood by those skilled in the art. Likewise the increase in the generative voltage of the generator 18 will increase the speed of the pilot motor 74 which drives the master inductive device 71, thereby causing the frequency of the poly-phase voltage supplied by this device to the regulating busses 78 to be increased in proportion. The increase in the speed of the motors 12—13, etc. will, of course, increase the frequency of the poly-phase voltages supplied by inductive devices 57, 58 to the differential devices 62—63 in like proportion. Consequently, the drive motors 12—13 will operate at the desired higher speed and the rotor member 80 of the differential device 62 will remain at rest as long as the speeds of the motors 12—13 remain at this desired higher value. Operation of the pilot motor 47 to increase the generator voltage of the generator 18 and the speeds of the motors 12—13 also causes the rotor 90 of the motion transmitting device 89 to rotate and, as explained above, this results in rotation of the rotor members of all the motion receiving devices, 83, 83ª etc., at the various sections of the drive in such a direction that the fulcrum members 84, 84ᵃ will be moved toward the right a distance which is proportional to the number of rotations of the pilot motor 47 and consequently proportional to the increase in speed of the driving motors 12—13 etc.

Now should the speed of the motor 12 for any reason, such for example as in increase in the load on the element 10, tend to decrease, the cam member 85 will be operated in the previously described manner in a clockwise direction so as to permit movement of the lever 83 about the fulcrum 84 in a clockwise direction to lessen the pressure on the carbon pile resistance 82 thereby increasing its ohmic value and also increasing the speed of the motor 12. However because of the fact that the fulcrum 84 has now been moved to a position nearer to the carbon pile resistance and more remote from the cam member 85, the lever must move a greater distance in order to effect the same change in the ohmic value of the resistance 82 than was the case when the fulcrum member 84 was in the mid-position illustrated in the drawing and the motor 12 was operating at a lower basic speed. Consequently, the cam member 85 will be required to move a greater distance in order to permit of this increased movement of the lever 83. It will thus be seen that as the speed of the drive is increased, the operating speed of the regulating devices is decreased and thereby the tendency of the regulators to cause hunting of the motors 12, 13 etc. at the higher speed of the drive is overcome.

Had the decrease button 56 been operated to decrease the basic speed of the drive, the operation would have been exactly the opposite of that above described which followed the operation of the increase button 55. In this event, the fulcrum of the lever arm of the regulating devices would be operated toward the left an amount proportional to the decrease in the speed of the motors 12—13 and as a result the cams which operate these levers, would not have to travel as far to effect the same ohmic change in the carbon pile resistances and consequently in the speeds of the motors 12—13 as was the case when the fulcrums of the lever arm were located further toward the right with the motors 12—13 operating at a higher speed. It will thus be clear that since the cams 85 are only required to travel a small distance in order to effect the same ohmic change in the carbon pile resistances that the operating speed of the regulators is increased as the speed of the drive is decreased. Consequently, the usual sluggishness of the regulators at low speeds of the drive is overcome and changes in the speeds of the drive motors 12—13 will be effected as rapidly at the low speed as at intermediate or high speed.

It will thus be clear that we have provided means for modifying the speed of operation of the regulators in accordance with adjustments in the basic speed of the drive motors 12—13 so that uniformly good regulation is obtained at all speeds of the drive.

Although in accordance with the provisions in the patent statutes we have described our invention as embodied in specific apparatus and connected in a particular manner, we would have it understood that the invention is by no means limited to the apparatus and connections shown since modifications and alterations will readily suggest themselves to persons skilled in the art without departing from the true spirit of this invention or from the scope of the annexed claims.

What we claim as new and desire to secure by Letters Patent of the United States, is:

1. A control system comprising in combination a dynamo electric machine, means for adjusting an operating characteristic of said machine to a plurality of values, regulating means comprising a pressure responsive resistance and actuating means for said resistance responsive to an operating condition of said machine for maintaining said characteristic substantially constant at a desired value, and means for modifying the action of said actuating means in accordance with adjustments in the value of said characteristic.

2. A control system for a dynamo electric machine comprising means for adjusting a characteristic of said machine to a plurality of values, a regulator comprising a carbon pile resistance and means movable in response to variations in said characteristic for actuating said resistance to maintain said characteristic substantially constant at the value to which said characteristic is adjusted, and means controlled by said adjusting means for modifying the movement of said regulating means in accordance with the values to which said characteristic is adjusted.

3. A control system comprising a dynamo electric machine having a field winding, means for adjusting an operating characteristic of said machine to one of a plurality of different values, a regulator having a carbon pile resistance connected in circuit with said field winding and movable actuating means for said resistance responsive to an operating condition of said machine for maintaining the characteristic of said machine substantially constant at an adjusted value, and means responsive to operation of said adjusting means for controlling the speed of operation of said actuating means in accordance with the values to which said characteristics are adjusted.

4. A control system comprising a dynamo electric machine, means for adjusting a characteristic of said machine to a plurality of values, regulating means for said machine comprising a variable resistance and a movable member controlled by an operating characteristic of said machine for controlling said resistance, and means controlled by said characteristic adjusting means for controlling the movement of said member.

5. In a system of motor control, the combination with an electric motor, means for adjusting the speed of the motor to one of a plurality of predetermined values, a regulator comprising a pressure responsive resistance and means operable in response to deviations of the speed of the motor from a desired value for actuating said resistance to restore the speed of said motor to said desired value, and means for varying the speed at which said actuating means operates in accordance with adjustments in the speed of said motor.

6. In a control system the combination with a dynamo electric machine of means for adjusting a characteristic of said machine to a plurality of values, means for producing a rotating magnetic field having a predetermined speed of rotation, means for producing a second rotating magnetic field having a speed of rotation of predetermined relationship with respect to the value of said operating characteristic of said machine, means comprising a movable member controlled by both said magnetic fields and a resistance controlled by the movement of said member for controlling an operating characteristic of said machine, and means for controlling the movement of said member in accordance with adjustments in the value of said characteristics.

7. A control system comprising an electric motor, means for adjusting the speed of said motor to a plurality of values, means for producing a rotating magnetic field having a predetermined speed of rotation, means operated by said motor for producing a rotating magnetic field having a speed of rotation of predetermined relationship with the speed of the motor, means comprising a movable member responsive to the phase relationship of said magnetic fields and a pressure responsive resistance connected in circuit with said motor and actuated by said member for controlling the speed of said motor, and means for modifying the movement of said member in accordance with adjustments in the speed of said motor.

8. A control system comprising an electric motor, means for producing an alternating voltage having a predetermined frequency, means operated by the motor for producing an alternating voltage having a frequency proportional to the speed of said motor, means comprising a movable member responsive to the phase relationship of said voltages and a pressure responsive resistance connected in circuit with said motor and controlled by the movement of said member for controlling the speed of said motor, and means movable in accordance with adjustments in the speed of said motor for modifying the movement of said movable member.

9. A system of motor control comprising an electric motor, means for producing a rotating magnetic field having a predetermined speed of rotation, means operated by the motor for producing a rotating magnetic field having a speed of rotation proportional to the speed of the motor, means comprising a movable member responsive to a variation in the relative speeds of said magnetic fields and a pressure responsive resistance connected in the field circuit of said motor and actuated by the movement of said member for controlling said motor to maintain the speed of said motor constant, means for adjusting the speed of said motor to a plurality of desired values, and means operated by said speed adjusting means for controlling the speed of the resistance actuating movement of said member.

10. A control system comprising an electric motor, an electrical device for generating an alternating voltage of predetermined frequency, a second electrical device operated by the motor for generating an alternating voltage having a frequency proportional to the speed of the motor, a pressure responsive resistance connected to said motor, means comprising an electrical differential device responsive to a variation in the phase relationship of said voltages and a movable element controlled by said differential device for actuating said resistance to control the speed of said motor, means for adjusting the speed of said motors to a plurality of desired values, and means comprising an electrical motion transmitting device driven by said speed adjusting means and an electrical motion receiving device connected to said transmitting device for controlling the movement of said movable member.

11. A motor control system comprising an electric motor, means for adjusting the speed of the motor to a plurality of values, means for producing an alternating voltage of predetermined frequency, means operated by the motor for producing an alternating voltage having a frequency proportional to the speed of the motor, a device movable in response to a variation in the phase relationship of said voltages, a resistance connected to said motor, a member movable in response to movement of said device for controlling said resistance to maintain the speed of said motor constant at a desired value, and means operable in accordance with the operation of said speed adjusting means for varying the ratio between the movement of said device and the resistance controlling movement of said member in accordance with adjustments in the speed of said motor.

12. A control system comprising an electric motor, a regulator for maintaining the speed of said motor constant at a desired value, said regulator comprising a member movable about a fulcrum, a device responsive to a variation in the speed of said motor for actuating said member and a pressure responsive resistance connected in circuit with said motor and actuated by said member, means for adjusting the speed of said motor to a plurality of desired values, and means controlled by said adjusting means for shifting the fulcrum of said member so as to vary the speed of operation of said regulator in accordance with adjustments in the speed of said motor.

13. A control system comprising an electric motor, means for adjusting an operating characteristic of said motor to a plurality of values, a regulator for maintaining said characteristic constant at a desired value, said regulator comprising a compressible resistance in circuit with said motor, a lever having an adjustable fulcrum, a cam for actuating said lever and a device responsive to a departure of said characteristic from a desired value for actuating said cam, and means responsive to an operation of said characteristic adjusting means for shifting the fulcrum of said lever so as to change the operating speed of said regulator in inverse proportion to a change in the adjustment of said characteristic.

14. A control system comprising an electric motor having a field winding, a regulator for maintaining the speed of the motor constant at a desired value, said regulator comprising a member movable about a fulcrum a device responsive to a variation in the speed of said motor for actuating said member and a pressure responsive resistance connected in circuit with said field winding and actuated by said member, means for adjusting the speed of said motor to a plurality of desired values, means comprising a motion transmitting device operated by said adjusting means and a motion receiving device electrically connected with said transmitting device for shifting the fulcrum of said member so as to vary the operating speed of said regulator in accordance with adjustments in the speed of said motor.

15. A control system comprising a generator and a main motor supplied therefrom, a regulator for maintaining the speed of the motor constant at a desired value, said regulator comprising a member movable about a fulcrum, means responsive to a variation in the speed of said motor for actuating said member and a compressible carbon pile resistance connected in circuit with said motor and arranged to be actuated by said member, an auxiliary motor and a rheostat actuated thereby for varying the voltage of said generator so as to adjust the speed of said main motor to a plurality of values, means comprising a motion transmitting device driven by said auxiliary motor and a motion receiving device connected with said transmitting device for moving the fulcrum of said member when the speed of said main motor is adjusted so as to vary the operating speed of said regulator in accordance with adjustments in the speed of said main motor.

16. A control system comprising an electric motor provided with a field winding, a pressure responsive resistance connected in circuit with said winding, a movable member having an adjustable fulcrum and arranged to cooperate with said resistance, means for adjusting the speed of said motor to a plurality of values, a device controlled by said adjusting means for generating a periodic voltage having a frequency proportional to the desired speed of said motor, a device operated by said motor for generating a periodic voltage proportional to the speed of said motor, an electrical differential device responsive to a change in the phase relationship between said voltages upon a deviation of the speed of said motor from a desired value for causing said member to actuate said resistance so as to restore the speed of said motor to said desired value, and means operated by said adjusting means for varying the fulcrum of said member in accordance with adjustments of the speed of said motor.

17. A plural motor drive for paper making machines and the like wherein a plurality of elements are required to operate in predetermined relationship with each other comprising a plurality of motors, means for producing an alternating voltage of a frequency having a predetermined relationship with the desired speeds of said motors, a separate electrical device operated by each of said motors for generating an alternating voltage having a frequency proportional to the speed of the associated motor, a separate electrical differential device associated with each of said motors for responding to variations in the phase relationships between said first mentioned voltage and the voltages produced by said electrical devices, a separate variable resistance connected in circuit with each of said motors, a separate member controlled by each of said differential devices for actuating a corresponding one of said resistances to maintain the speeds of said motors substantially constant, means for simultaneously adjusting the speed of said motors to desired values, and means for simultaneously modifying the action of said actuating members in accordance with adjustments in the speeds of said motors.

18. A sectionalized drive for paper making machines and the like comprising a supply generator, a separate drive motor for each section of the drive supplied from said generator, a separate inductive device driven by each of said motors for generating an alternating voltage having a frequency proportional to the speed of the motor, an auxiliary motor supplied from said generator and an inductive device driven thereby for generating voltage of a frequency having a predetermined relationship with the speeds of said motors, a separate electrical differential device associated with each of said motors responsive to a variation in the phase relationship of said voltages, a separate pressure responsive resistance connected to each of said motors, a separate movable member actuated by each of said differential devices for actuating one of said resistances to hold the speeds of said motors constant, means comprising a second auxiliary motor and a rheostat operated thereby for varying the voltage of said generator to vary the speeds of all of said drive motors and said first auxiliary motor simultaneously and means operated by said second auxiliary motor for simultaneously varying the speed of operation of said members in accordance with adjustments in the speeds of said motors.

19. A sectionalized drive for paper making machines and the like comprising a separate drive motor at each section of the drive, a generator for supplying said motors, a separate regulator for each motor for maintaining constant speed thereof, said regulator comprising a pressure responsive resistance connected in circuit with said motor, a lever having an adjustable fulcrum and arranged to actuate said resistance, a cam for actuating said lever, and means responsive to a variation in a desired speed of said motor for actuating said cam, means comprising an auxiliary motor and a rheostat operated thereby for varying the voltage of said generator to adjust the speeds of all of said motors simultaneously, and means comprising a motion transmitting device driven by said auxiliary motor and a plurality of motion receiving devices connected to said transmitting device, one of said receiving devices being located at each section of the drive and arranged to shift the fulcrums of said levers to vary the speed of operation of said regulators in accordance with adjustments in the speed of said motors.

20. A plural motor drive for paper making machines and the like comprising a separate drive motor for each section of the drive, a generator for supplying said motors, an auxiliary motor supplied from said generator and an inductive device driven thereby for generating an alternating voltage of a frequency having a predetermined relationship with a desired speed of said drive motors, a second auxiliary motor and a rheostat operated thereby for varying the voltage of said generator to simultaneously and proportionally adjust the speeds of all of said drive motors and the frequency of said alternating voltage, a separate speed regulator for each of said drive motors, said regulator comprising a carbon pile resistance connected in the field circuit of the associated motor, a lever having an adjustable fulcrum for actuating said resistance, and a cam for actuating said lever, a separate inductive device driven by each of said drive motors for generating an alternating voltage having a frequency proportional to the speed of the motor, a separate electrical differential device responsive to a variation in the phase relationship of said alternating voltages for actuating said cam, a motion transmitting device operated by said second auxiliary motor and a plurality of motion receiving devices, one for each of said drive motors, for shifting the fulcrums of said levers thereby to vary the speed of operation of said regulators in accordance with adjustments in the speed of said motors.

In witness whereof, we have hereunto set our hands this 12th day of December, 1930, and this 13th day of December, 1930.

LOUIS W. THOMPSON.
EDWARD H. HORSTKOTTE.